United States Patent Office 2,779,194
Patented Jan. 29, 1957

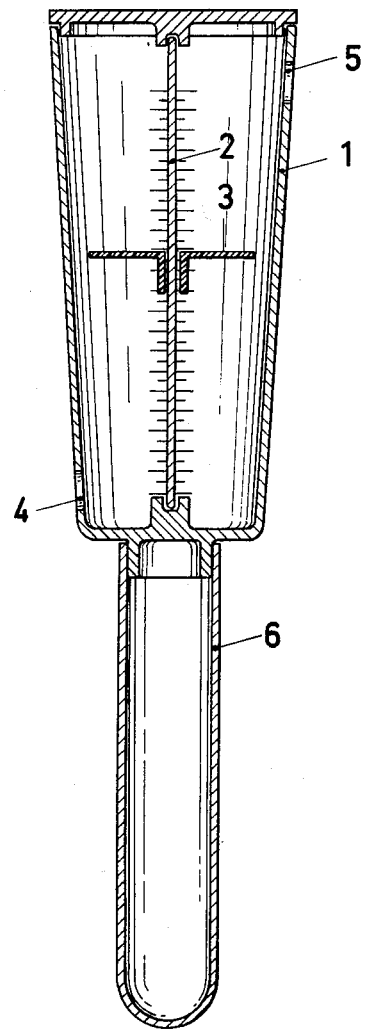
INVENTOR
KARL IVAR GUSTAV SLETTENMARK
ATTORNEY

---

2,779,194

WIND-GAUGE WORKING ON THE PRESSURE PRINCIPLE

Karl Ivar Gustav Slettenmark, Stockholm, Sweden

Application March 11, 1953, Serial No. 341,720

Claims priority, application Sweden April 30, 1952

5 Claims. (Cl. 73—209)

The present invention relates to a wind-gauge working on the pressure principle for the measurement of wind velocity.

As regards their way of functioning, wind-gauges can be divided into two types; rotary and pressure gauges.

The rotary gauges employ a propeller or a cup-cross which the wind causes to revolve at a speed which is proportional to the wind velocity. Generally, the number of revolutions during a certain time is recorded and thereby the mean value of the wind velocity during the same time is obtained. The gauges can also be designed in such a way that readings can be taken of the instantaneous wind velocity, which often is of greater interest. However, if designed in this way the rotary gauges will be relatively complicated and expensive.

The pressure gauges utilize the dynamic pressure of the wind, which is proportional to the square of the wind velocity. They are always directly indicating. Earlier known wind-gauges working on the pressure principle can be divided into the following three groups:

1. A rotatably mounted plate or the like is directly influenced by the wind and turned through a certain angle until balance is obtained between the wind pressure and the directional force of the measuring system. This device is simple and relatively cheap but the measuring system has poor self-damping which hampers an exact reading. Special devices for obtaining effective damping of these instruments will make them much more expensive.

2. The principle of a plate, which is turned under the influence of the wind pressure, is also to be found in the draught indicators. However, here the plate moves in a closed chamber and the air is taken into and out of the chamber through a modified Pitot-tube, which is formed in such a way that the necessary quantity of air can pass through the indicator. Inside the chamber the air flows through a narrow slit between the plate and the chamber wall, and the plate finds a position of equilibrium which is determined by the pressure on the plate and the directional force from a spring. These gauges are very well damped but are relatively expensive.

3. To the third group of pressure gauges may finally be assigned different sorts of liquid and diaphragm manometers in combination with a Pitot-tube. Contrary to the last mentioned group, these instruments operate purely statically, i. e. no air passes through the measuring system. The wind-gauge according to the present invention has a measuring system in the form of a float-meter through which the wind pressure drives a certain air current through suitably arranged inlet and outlet openings. In this way it differs from previously known wind-gauges, as float measuring devices have not been used before for wind-gauges. As is well known, a certain pressure is required to lift the float in a float-meter, and this pressure is determined by the weight and area of the float. In order that the wind-gauge shall be sensitive to as low a wind velocity as possible, when the dynamic wind pressure is relatively low, the float must be as light as possible. Therefore, the float has been given the form of a thin plate or disc provided with a hub which is guided on a shaft in the centre of the measuring tube.

With this measuring system which is a novelty as regards wind-gauges, an instrument of very good quality as to accuracy and damping is obtained, by means of which even readings of the wind velocity in gusts can be taken without disturbing oscillations. Furthermore, the instrument can easily be designed in such a way that it will be relatively cheap to manufacture. The float measuring system imposes a certain low limit upon the measuring range, because the float cannot lift the scale until the wind velocity exceeds a certain value. However, this is not of great practical importance, as it is only a relatively small range below about 3 to 4 metres per second that cannot be measured in this way.

The float-meter has been known for a long time but has so far only been used for measuring speeds of flow in pipes. Here the speed is measured either in such a way that the whole flow (liquid or gas) passes through the float-meter or else the float-meter can be used in combination with a shunt in the pipe. Only a smaller part of the flow, determined by the flow resistance in the float-meter with its connecting pipes and the fall of pressure in the shunt (venturi tube, throttle-flange or the like) will then pass through the float-meter.

The invention will be further described with reference to the attached drawing, which shows an example of a wind-gauge of the newly-invented type.

In the centre of a conical tube 1 of circular section, which is closed at both ends and made of transparent material, a shaft 2 is mounted between the cover and the bottom of the tube. A disc 3 provided with a hub can slide freely along the shaft between two end positions, a lower position near the bottom and an upper position near the top cover. The position of the disc can be read off against a scale on the outside of the transparent tube. An air inlet in the shape of a hole 4 is placed at the bottom end of the tube in such a way that the disc is entirely above the hole even in the lower end position. An air outlet in the shape of a hole 5 is placed at the upper end of the tube, on the side diametrically opposite to the lower hole, in such a way that the disc is entirely below the hole within the whole scale range. A hollow handle 6 of transparent material is mounted underneath the tube.

When taking measurements the gauge is orientated in such a way that the tube 1 is vertical and the lower hole 4 directed towards the wind. When the wind flows past the tube 1 a certain difference of pressure, proportional to the square of the wind velocity, arises between the lower hole 4 on the pressure side and the upper hole 5 on the downstream side. Hence the pressure on the under side of the disc 3 will be greater than the pressure on the upper side. Should this difference of pressure exceed a value equal to the weight of the disc, the disc will be lifted. Inasmuch as the tube 1 is conical, the annular slit between the disc and the tube increases in width the higher the disc is lifted. For a given wind velocity the difference of pressure will therefore be reduced the higher up in the tube the disc comes, until the disc finds a new position of equilibrium, determined by the difference of pressure between the lower and upper side of the disc being equal to the weight of the disc. The displacement of the disc from the lower end position is consequently a measure of the wind velocity.

Since the position of equilibrium of the disc after being lifted from the lower end position is always characterized by the difference of pressure between the two sides of the disc being constant, the air velocity in the slit between the disc and the tube must also be constant. The air quantity which is driven through the tube is determined by the difference of pressure between the lower and the upper hole and by the total flow resistance in the wind gauge which principally consists of the flow resistance in the slit and in the inlet and outlet holes. When the slit is small, the fall of pressure in the slit predominates, but when the disc comes higher up in the tube the slit gets wider so that the fall of pressure here becomes more and more negligible in relation to the fall of pressure in the holes. At higher wind velocities, the air quantity passing through the tube will therefore become approximately proportional to the wind velocity. Inasmuch as the speed of the air is constant in the slit when the disc is in equilibrium, and the increase in slit area is approximately proportional to the displacement of the disc, a scale graduated in terms of wind velocity will have an approximately linear graduation at higher wind velocities.

If the measuring range of the gauge is to be extended downwards to cover as low wind speeds as possible the disc must be as light as possible. Furthermore, the area of the slit must at the same time be small in relation to the area of the inlet and outlet holes, so that the greater part of the fall of pressure in the gauge will arise in the slit, giving a lifting effect on the disc. In order that the desired measuring range should be obtained within a certain length of the scale for a given weight and area of the disc, the area of the inlet and outlet holes must have a certain fixed relation to the diameter and taper of the measuring tube.

The wind-gauge according to the embodiment described here has a conical measuring tube whereby the scale becomes approximately linear at higher wind velocity. The measuring tube can also be given such a shape that its section increases in a manner other than linearly upwards, in which case some other desired scale characteristic can be obtained. In such a case it is only essential that the tube has a section which increases upwards, because the float cannot find a stable position of equilibrium within a region having a cross-section which decreases upwards.

In the embodiment described above the inlet and outlet openings, through which the wind pressure drives a certain air current through the gauge, are of the simplest possible sort. Even other embodiments and locations are conceivable, whereby it is only essential that the openings are arranged in such a way that a certain difference of pressure is obtained between the outside mouths of the openings for driving an air current past the float through the measuring tube.

The handle below the tube is for holding the gauge with one hand while taking a measurement. It can suitably be hollow and made of transparent material in which case a readable text can be enclosed in it, e. g. directions for use or a wind table.

I claim:

1. A portable wind gauge of the pressure responsive type, comprising a measuring tube of increasing cross-section, the end of the tube having the narrow cross-section constituting the operational lower end thereof and being closed by an end wall, a flat cover having a depending flange fitted upon the upper end of the tube for closing the same, a shaft disposed within said tube coaxially therewith, said end wall and said cover being each formed with a boss respectively upwardly and downwardly extending within the tube and having an axial bore to form a lower and an upper bearing for the shaft, a float disposed freely slidable on said shaft, the cross-section of said float being less than the minimum cross-sectional area of said tube so as to provide a peripheral slot of increasing width along the entire operational length of the tube, the said tube being formed with an air inlet near the lower operational end of the tube and an air outlet near the operational upper end of the tube, the said air inlet and the said air outlet being disposed in a spatial relationship such that an air current flowing past the tube when in vertical position and facing said air current with its inlet produces a pressure drop between the air inlet and the air outlet causing the float to assume a position of equilibrium indicative of the velocity of the air current, the boss on said end wall forming a stop for the float in the lowermost position thereof, and a closed hollow handle extending from the narrow end of the tube.

2. A wind gauge according to claim 1, wherein the said handle is made of transparent material for making viewable from the outside of the handle intelligence placed therein.

3. A wind gauge according to claim 1, wherein the said tube is of frusto-conical configuration and the said float is in form of a disc having a diameter less than the diameter of said tube so as to provide an annular slot of increasing radial width along the entire operational length of the tube, the said air inlet and the said air outlet being formed in diametrically opposite wall portions of the tube.

4. A wind gauge according to claim 1, wherein said end wall is formed on its outside with a depending flange, said hollow handle being fitted upon said flange.

5. A portable wind-gauge of the pressure responsive type, comprising a measuring tube of increasing cross-section, the end of the tube having a narrow cross-section being the operational lower end thereof and closed by an end wall integral with the tube, a closure member closing the other end of the tube, upper and lower retaining means extending inwardly into the tube from said closure member and said end wall respectively, a shaft within the tube retained by said retaining means coaxially with the longitudinal axis of the tube, a float disposed freely slideable on said shaft, the peripheral outline of said float being less than the minimum cross-sectional area of said tube so as to provide a peripheral slot of increasing width along the entire operational length of the tube, the said tube being formed with an air inlet near the lower operational end of the tube and an air outlet near the operational upper end of the tube, the said air inlet and the said air outlet being disposed in a spatial relationship such that an air current flowing past the tube when in perpendicular position and facing said air current with its inlet produces a pressure drop between the air inlet and the air outlet causing the float to occupy a position of equilibrium indicative of the velocity of the air current, the retaining means on said end wall forming a stop for the float in the lowermost position thereof, and a closed hollow handle extending from the narrow end of the tube.

References Cited in the file of this patent

UNITED STATES PATENTS

| | | |
|---|---|---|
| 1,050,350 | Davis | Jan. 14, 1913 |
| 2,127,163 | Davis | Aug. 16, 1938 |
| 2,176,698 | Albrecht | Oct. 17, 1939 |
| 2,202,253 | Hiatt | May 28, 1940 |
| 2,608,859 | Sontag et al. | Sept. 2, 1952 |

FOREIGN PATENTS

| | | |
|---|---|---|
| 357,140 | France | Oct. 30, 1905 |